(12) United States Patent
Alleysson et al.

(10) Patent No.: US 8,564,699 B2
(45) Date of Patent: Oct. 22, 2013

(54) DIGITAL IMAGE SENSOR, IMAGE CAPTURE AND RECONSTRUCTION METHOD AND SYSTEM FOR IMPLEMENTING SAME

(75) Inventors: David Alleysson, Moirans (FR); Brice Chaix De Lavarene, Beaumont de Pertuis (FR); Jeanny Herault, Saint Egreve (FR)

(73) Assignees: Centre National de la Recherche Scientifique—CNRS, Paris (FR); Universite Joseph Fourier, Grenoble (FR)

( * ) Notice: Subject to any disclaimer, the term of this patent is extended or adjusted under 35 U.S.C. 154(b) by 680 days.

(21) Appl. No.: 12/664,320

(22) PCT Filed: Jun. 12, 2008

(86) PCT No.: PCT/FR2008/000806
§ 371 (c)(1),
(2), (4) Date: Jun. 16, 2010

(87) PCT Pub. No.: WO2009/007543
PCT Pub. Date: Jan. 15, 2009

(65) Prior Publication Data
US 2010/0253818 A1      Oct. 7, 2010

(30) Foreign Application Priority Data
Jun. 12, 2007   (FR) ..................................... 07 04181

(51) Int. Cl.
*H04N 3/14*     (2006.01)
*H04N 5/335*    (2011.01)
*H04N 9/04*     (2006.01)

(52) U.S. Cl.
USPC ............ 348/272; 348/273; 348/274; 348/275

(58) Field of Classification Search
USPC .......................... 348/272–278, 335, 340, 345
See application file for complete search history.

(56) References Cited

U.S. PATENT DOCUMENTS

| 6,803,955 B1 * | 10/2004 | Yosida ........................... 348/272 |
| 7,123,299 B1 | 10/2006 | Yoshida et al. |
| 2003/0210332 A1 | 11/2003 | Frame |
| 2007/0296841 A1 * | 12/2007 | Nomura ........................ 348/273 |

FOREIGN PATENT DOCUMENTS

JP       09168157 A     6/1997

* cited by examiner

*Primary Examiner* — Yogesh Aggarwal
(74) *Attorney, Agent, or Firm* — Arent Fox LLP

(57) ABSTRACT

The invention aims to solve the problem of eliminating the trade-off between the complexity of the digital image capture device and captured image reconstruction and the quality of the image. For this purpose, the invention provides a digital image capture sensor (18) including an array (16) of color filters, which array comprises a plurality of identical basic patterns (70) which are replicated with no overlap, each basic pattern being formed by color filters (72, 82, 84) which are pseudo-randomly arranged, such that each basic pattern (70) contains a variable pitch between two consecutive same-type color filters in the horizontal and/or vertical directions of the basic pattern.

17 Claims, 4 Drawing Sheets

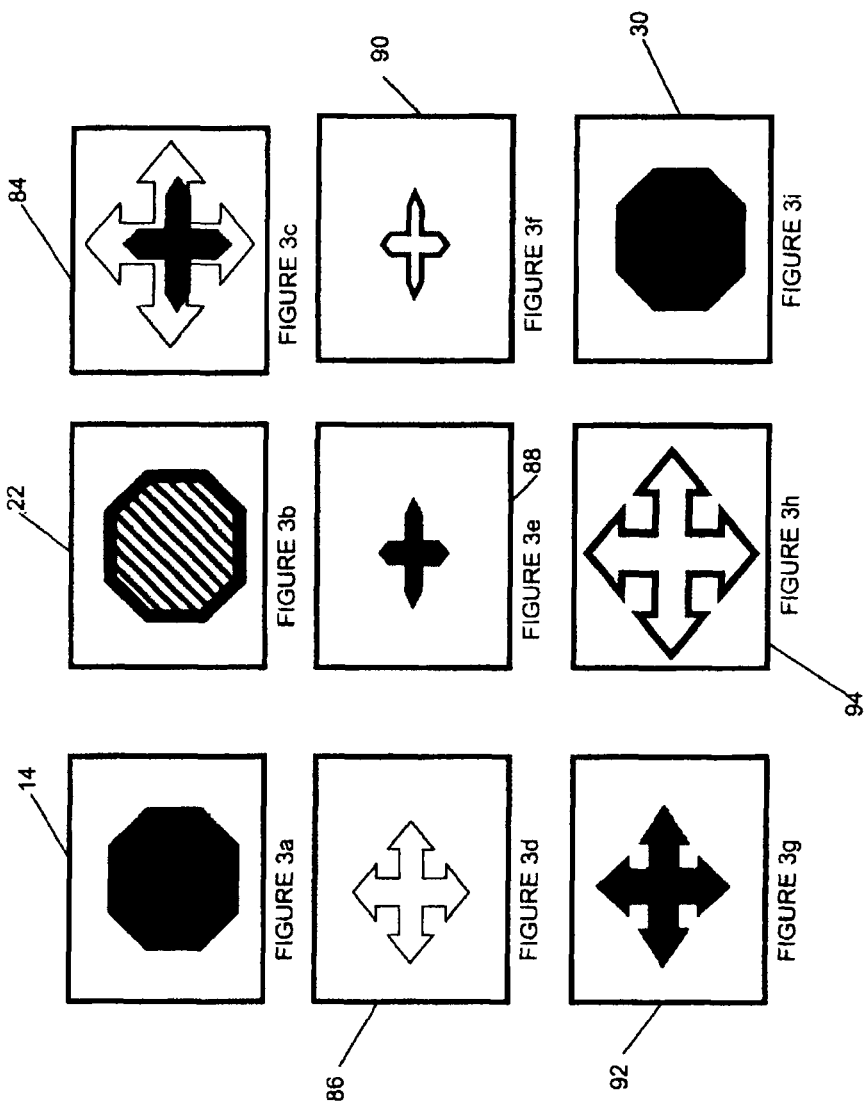

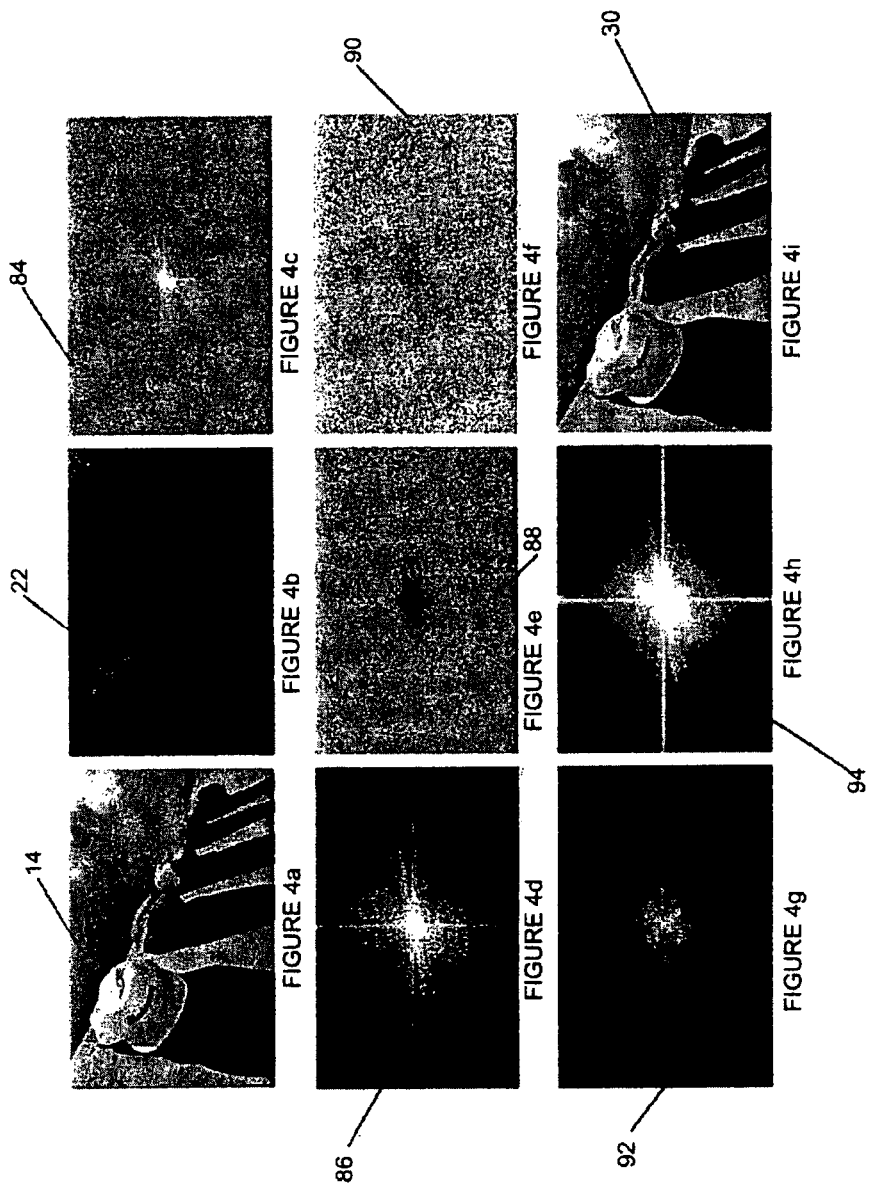

Figure 1:
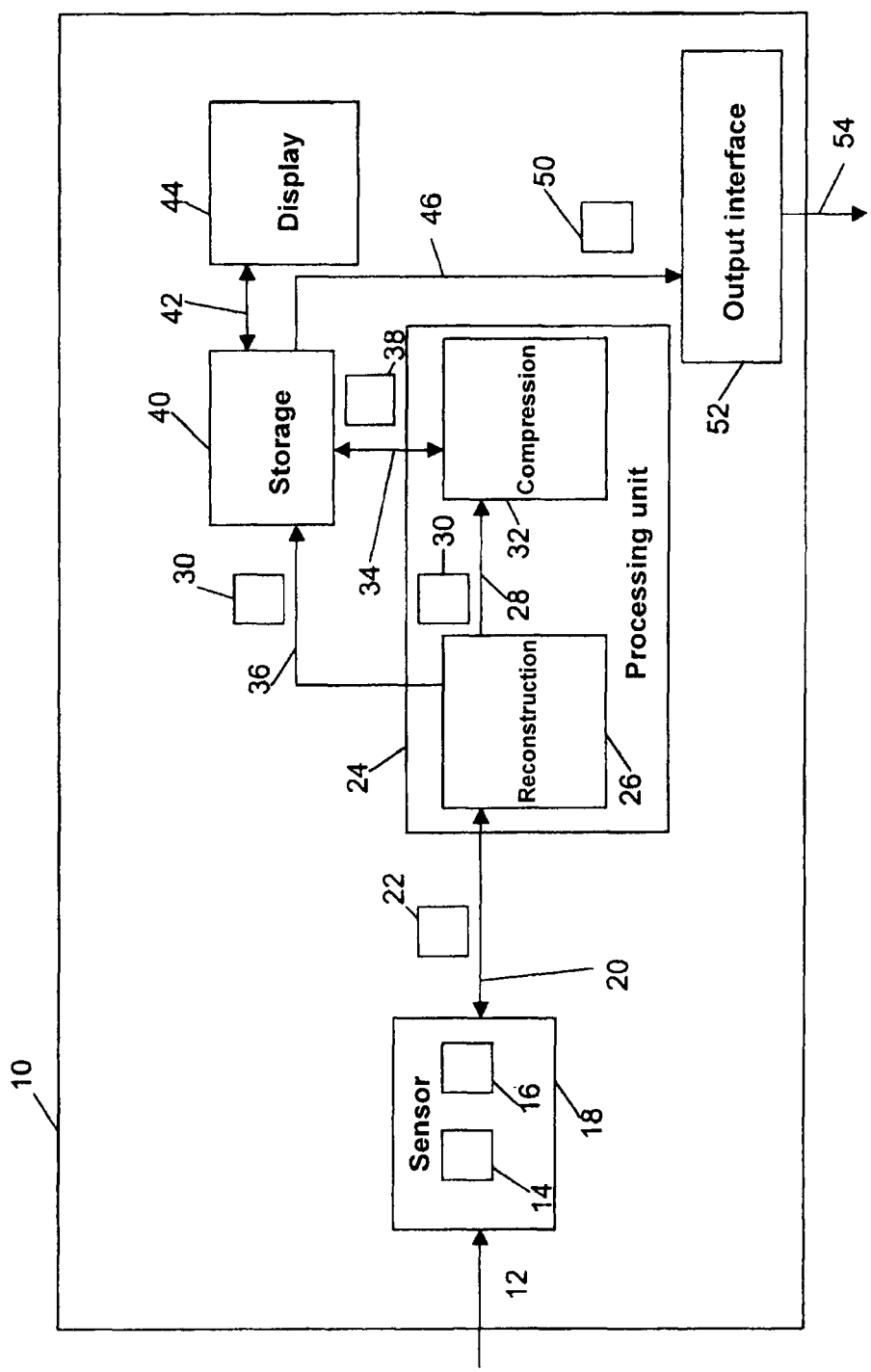

DIGITAL IMAGE SENSOR, IMAGE CAPTURE AND RECONSTRUCTION METHOD AND SYSTEM FOR IMPLEMENTING SAME

CROSS-REFERENCE TO RELATED APPLICATION

This application is a National Stage entry of International Application No. PCT/FR2008/000806, filed Jun. 12, 2008, which claims Priority to French Application No. 07/04181, filed Jun. 12, 2007, the entire specification claims and drawings of which are incorporated herewith by reference.

The present invention relates to a colour sensor dedicated to the acquisition of images, an image acquisition and reconstruction method and a system for implementing said method.

The present invention is located in the domain of the digital processing of images and sequences of images, during the acquisition thereof by a camera and reconstruction thereof and saving in raw or compressed format.

The acquisition of colour images, for example by means of digital video and photographic devices, includes post-processing after the acquisition in order to improve the quality of the digital images captured, connected downstream to colour image representation and image compression systems.

However, in order to reproduce a high visual quality image, the majority of current cameras or digital photographic devices use a sensor in front of which is placed an array of colour filters.

Each colour filter being a transparent component which lets a portion of the light pass through and absorbs another portion of light, the spectral distribution of the transparency defines the colour of the filter.

The captured images are made up of "pixels", the pixel representing a digital component of the image, characterised by the position (row/column) thereof in the image and by the digital value thereof, corresponding to a level of grey or colour.

"Size" of the image means the number of rows multiplied by the number of columns, i.e. the number of pixels.

The terms "horizontal/vertical" are generally used respectively for determining the size of an image in height (number of rows) and in width (number of columns).

Said array of colour filters gives each pixel of the sensor a different spectral sensitivity in order to permit representation of the colour. In return, with said method, a single colour is sampled with each pixel. Consequently, a step for demosaicing (i.e. interpolation of the three components of the colour "RGB, Red, Green, Blue"), or for estimating the luminance and interpolating the chrominances, are necessary in order to reconstruct a colour image having three spectral sensitivities per pixel. In the present description, "luminance" means the achromatic component of the image, and "chrominance" or "chrominances" or "three components of the chrominance" means the chromatic component of the image being free of luminance information.

In order to reduce the complexity of the processing, the prior art knows a number of solutions.

For example, currently the most commonly used array of colour filters, and arranged in a sensor is the so-called Bayer CFA ("Color Filter Array"). Said array is periodic and consists of a regular alternation, of red and green pixels one row out of two, and an alternation of green and blue pixels on the other row.

The main problem of said array is that the interpolation generates visible artefacts which hinder the visual quality after the reconstruction of the image. One of the techniques for reducing the generation of artefacts is to use four photosites in order to reconstruct a single pixel. Each photosite represents a photoelectric cell, said photosite being sensitive to the light intensity in a wavelength range (red, green or blue) that it translates by producing a small electric current relating to the spatial sensitivity. The combination of currents of four photosites makes it possible to construct the three colours of the pixel. Nevertheless, said technique increases the complexity of the sensor, because the number of useful pixels for a digital image is reduced by factor four in comparison to the number of photosites.

Other known methods aiming to replace said Bayer method, for example, by photon absorption difference, or the creation of super CDD ("Charged Coupled Device") with hexagonal configuration, completely modify the post-processing of the acquired image in relation to a Bayer filtering. This results in the acquisition and processing systems and methods becoming more complex.

Moreover, comparative studies for the most known reconstruction methods (for example, the Laplacien corrected gradient method, the predefined coefficients methods, the alternating projection method, the frequency selection methods, the Wiener methods), carried out by PSNR ("Pick Signal to Noise Ratio") objective measurements, clearly demonstrate that there is a compromise between the quality of the image reconstructed and the complexity of the reconstruction method. A high quality of the reconstructed image requires a high complexity of the acquisition device and/or of the reconstruction method. The complexity represents the consumption in equipment and computer resources, such as for example the processing speed, the size of the operational memory for executing the method, the size of the memory for saving the results, the consumption in processing power and in processing time. The complexity of a camera acquisition system is also linked to the hardware components, such as the sensor in terms of performance, robustness, size and cost.

Also, from the point of view of the subjective perception of reconstructed images, the algorithms that are performant in terms of objective measurement, certainly reduce certain artefacts, but tend to increase other visual defects.

To overcome the artefact generation problem, it is known to use a random or pseudo-random arrangement of colour filters on the surface of the sensor. Indeed, it is known that random sampling is not constrained to the aliasing phenomenon. For a random or in other words non-periodic distribution of colour filters, the mixture of spatial and chromatic information in the representation of the image is therefore limited and consequently the occurrence of artefacts is reduced.

A sensor comprising a random arrangement is for example known in the Chaix de Layerne et al. publication "Traitement non linéaire uniforme pour la reconstruction d'une mosaïque chromatique répartie aléatoirement" (uniform non-linear processing for reconstruction of a randomly distributed chromatic mosiac) or in the patent application US 2003/0210332.

However, a non-periodic or random distribution of the colour filters on the array makes it difficult to interpolate missing colours because the neighbourhood of a given pixel is unknown and varies from one area of the image to another, as opposed to the case of a regular pattern such as a Bayer pattern.

The invention aims to mitigate said disadvantage of the prior art.

For this purpose, the idea at the basis of the invention is to combine the advantage of the random distribution which makes it possible to reduce artefacts, whilst maintaining a certain regularity in the array forming the sensor so that the interpolation of missing colours is not too complex.

The present invention therefore aims to eliminate the compromise between the complexity of an acquisition device in connection with the complexity of the reconstruction of a captured image and the quality of said image, whilst tending towards a high quality of the image, corresponding to the subjective perception of the human eye.

The present invention starts from the model of random distribution of colours in the human eye to make it possible to increase the quality of the image perceived via the reduction of artefacts.

Thus, the invention proposes a pseudo-random arrangement (again hereafter known as "non-periodic") of colour filters on the surface of a sensor, the pseudo-random sampling not being constrained to the aliasing phenomenon, consequently reduces the consistency of the errors generated. The combination of said pseudo-random arrangement with a method for reconstructing the captured image, suitable for said arrangement, optimises the quality of the captured image/complexity of the reconstruction method and of the acquisition device ratio.

"Pseudo-random pattern" means a pattern of a sensor comprising colour filters arranged with a, previously indeterminate, irregular arrangement, the "pseudo" qualifier being used due to the fact that a purely random character cannot be obtained by the computer processes, carried out by digital computers, which are deterministic devices.

More specifically, the object of the present invention is a digital image acquisition sensor comprising an array of colour filters, the array consisting of a plurality of identical basic patterns which are replicated with no overlap, each basic pattern being formed by colour filters which are pseudo-randomly arranged, such that each basic pattern contains a variable pitch between two consecutive same-type colour filters in the horizontal and/or vertical directions of the basic pattern.

Such that, the use of pseudo-random basic patterns makes it possible to reduce artefacts, and the replication with no overlap of said basic patterns introduces a certain regularity which facilitates the interpolation of colours.

The document US 2003/0210332 describes an array of colour filters consisting of a plurality of basic patterns. However, said document does not provide information on the fact that the basic patterns are replicated with no overlap, each of the patterns being formed by colour filters arranged pseudo-randomly.

According to the invention, the limitation of the consistency of the mixture of spatial and chromatic information in the representation of the image reduces the occurrence of artefacts having an impact on the image quality.

The acquisition of images thus carried out also makes it possible to partly use known post-processing methods, for example those developed in the Bayer case, and to improve the performances thereof.

According to preferred features:
the sensor comprises an array of colour filters, the basic pattern of the colour filters of which is equal to or larger than 4×4 pixels of an image and is smaller than the size of said image;
the sensor comprises an array of colour filters, the basic pattern of the colour filters of which is the same size as the size of the image;
The invention also relates to a method for acquiring and reconstructing sequences of digital images, said images being filtered during the acquisition thereof by said sensor by means of said array of colour filters, by thus carrying out acquisition of the red, green and blue components for a reconstruction of at least one image, from said components acquired from each image.

According to the specific modes for implementing said method:
a luminance and chrominance decomposition of the acquired image is carried out in order to apply the reconstruction filters, said decomposition reducing the complexity of the reconstruction filters;
a luminance and chrominance decomposition of the acquired image is obtained by means of a pseudo-random pattern sensor for the chrominance and a sensor free of an array of colour filters for the luminance; —the luminance is estimated and the three components of the chrominance are interpolated from the data acquired by the pseudo-random pattern sensor;
the luminance is estimated and the three chrominance components are interpolated from the acquired data by the pseudo-random pattern sensor;
the reconstruction of the image is carried out from the estimated luminance and the three interpolated components of the chrominance from the captured image.
the reconstruction of the image is linear and only involves a weighting of a neighbourhood of pixels, from the basic pattern and from a neighbourhood;
the reconstruction of the image is adaptive, non-linear, and carries out an interpolation of the chrominances brought back into the baseband, via a calculation based on the gradient of the low frequencies of the luminance estimated by a standardised low-pass filter, said gradient of the luminance indicating the vertical or horizontal direction of interpolation of the three chrominances;
demosaicing is carried out by eliminating high-risk frequencies by transfer of carriers of said zero spatial frequency chrominances.

With the aid of said image acquisition and reconstruction method and the various implementations thereof, the quality of the images is improved and the complexity of the reconstruction is reduced.

The estimation of the coefficients of the linear luminance filter produced by means of a sensor being free of an array of colour filters, with which an achromatic image is captured, represents an alternative to the calculation of coefficients by the method of least squares of the quadratic error between an intermediate image in simulated mosiac and an estimated luminance.

Database of images means a collection of colour images having three colours: red, green and blue on each pixel of the image. Said database originates from a system having three sensors for sampling the three colours at each spatial position.

A mosiac of the database of images represents the simulation of the effect of said mosaic of colours on the database of images. In order to obtain a mosaic of the database of images, the colours of the pixels which are not present in said mosaic at the position considered are artificially deleted.

For the mosaics with irregular distribution, the calculation of the gradients is adapted according to the neighbourhood of each pixel. The present invention uses said common property of all of the mosaics, i.e. the luminance is located in the baseband, and therefore proposes a gradient calculation on the low frequency components of the luminance which is uniform throughout the entire image. Said calculation makes good use of the contours calculated by gradients on the low frequency components of the luminance for better interpolation of the chrominance.

The invention also relates to a system for acquiring and reconstructing sequences of digital images in order to implement the method. Said system consists of acquisition and digital processing modules connected with one another, comprising at least one pseudo-random colour sensor, a compression module connected to a reconstruction module, a storage module, a display module and an output interface.

According to preferred features:
- the image is reconstructed, in the reconstruction module, via a linear method which only involves a weighting of a neighbourhood of pixels;
- the image is reconstructed, in the reconstruction module, via an adaptive method which carries out an interpolation of the chrominances brought back into the baseband, via a calculation based on the gradient of the luminance estimated by a standardised low-pass filter, said gradient indicating the vertical or horizontal direction of interpolations of the chrominances;
- the image reconstructed in the reconstruction module is compressed by at least one encoder in said compression module;
- the image reconstructed in the reconstruction module is compressed by at least one encoder included in said compression module;

Apart from the optimisation of the complexity/quality ratio, the present invention proposes a solution that is very well suited to the implementation on supports having processing capacity and size constraints, such as those containing on-board applications, for example mobile phones, surveillance cameras, or mini acquisition cameras such as webcams.

In general, the present invention targets any colour image acquisition and processing system (for example high-definition cameras, photophones, satellites), and is also suitable for pre-processing for any format and system of compression of images of digital video sequences.

The present invention is an alternative for the method currently the most commonly used, i.e. the so-called Bayer method, according to which good use is made of the contours of the image for better interpolation of the chrominance, the contours being calculated by gradient on the low frequency components of the luminance.

Figures 2A, 2B:
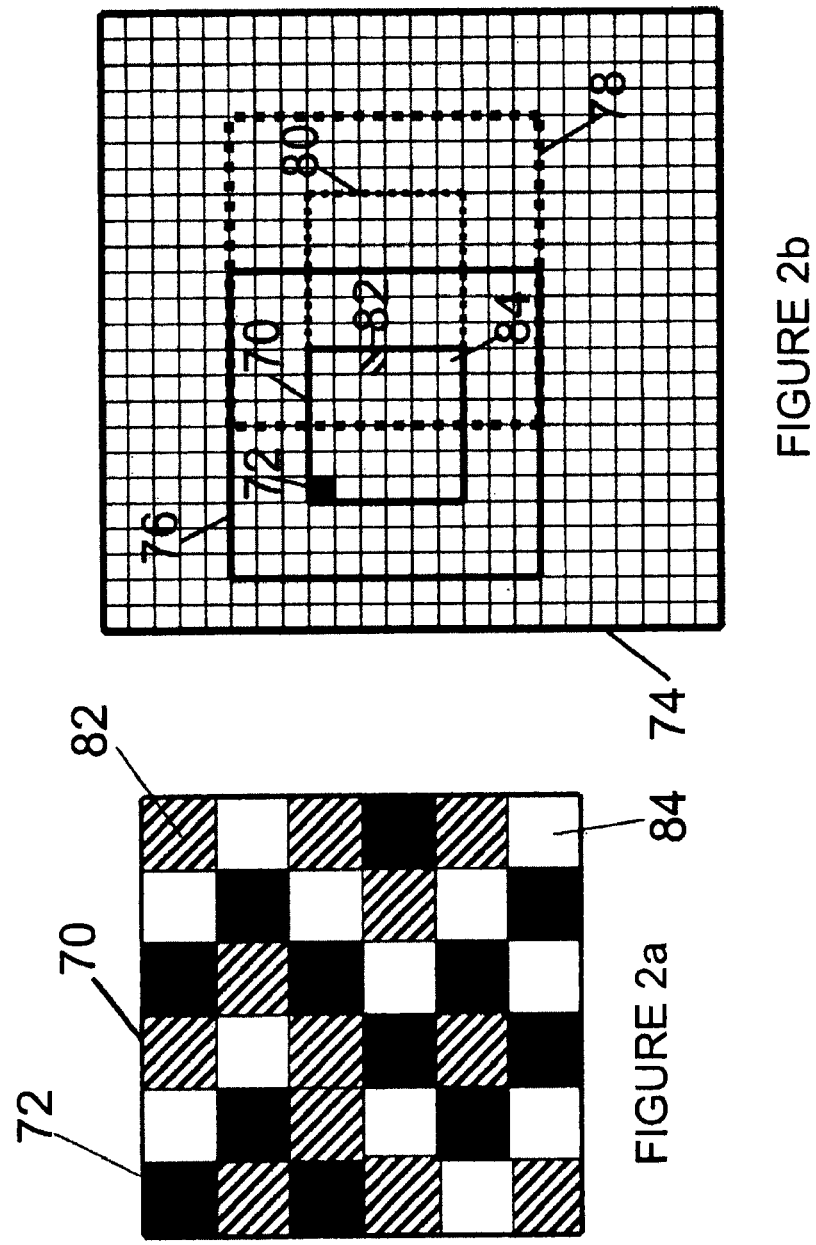

The present invention will be better understood hereafter by means of examples of non-limiting embodiments, in reference to the drawings appended which respectively represent:
- in FIG. 1, an example of a system for implementing a method according to the invention with a digital camera equipped with a pseudo-random pattern colour sensor;
- in FIGS. 2a and 2b, a first example of acquisition of the image from an array of a pseudo-random sensor by means of a reduced pattern and of linear reconstruction of the image;
- in FIGS. 3a and 3i, a second example of acquisition from an array of a pseudo-random sensor, by means of a pattern equal to the size of the image and of adaptive reconstruction;
- in FIGS. 4a and 4i, said second example of acquisition from an array of a pseudo-random sensor, by means of a pattern equal to the size of the image and of adaptive reconstruction;

An example of a system implementing the method for acquiring via a pseudo-random pattern sensor and for processing the digital images of the present invention, consisting of processing modules interconnected with one another, is presented in reference to FIG. 1.

A digital camera 10 consists of a pseudo-random pattern colour sensor 18 according to the invention, a processing unit 24, comprising a reconstruction module 26 and a compression module 32, a storage module 40, a display module 44 and an output interface 52.

An image 14 acquired by the sensor 18 via the link 12, is filtered by means of the array of pseudo-random colour filters 16, which is already included in the sensor. The filtered image 22 is transmitted via the link 20 to the processing unit 24, more specifically to the reconstruction module 26, carrying out the application of the linear reconstruction filters, and the interpolation, inside of which is produced the reconstruction of the captured image. The processing unit 24 is also able to communicate with the sensor 18 via the link 20.

The image reconstructed 30 in raw format is transmitted to a storage module 40 via the link 36 to be saved. Also, the image reconstructed 30 in raw format is transmitted directly to a display module 44 to be viewed. Alternatively, the reconstructed images saved in the storage module 40 are transmitted to the display module 44 via the link 42 and be viewed at a later date.

Alternatively, the reconstructed image 30 is transmitted via the link 28 to a module for compressing 32 images into raw format. The compression module contains at least one digital encoder. Alternatively, the compression module 32 is included in the reconstruction module 26. After encoding, the compressed image 38 is transmitted to the storage module 40 via the link 34.

Alternatively, the compressed image 38 is transmitted to the display module 44 to be viewed. The display module 44 comprises at least one digital encoder suitable for interpreting the compressed image 38. Alternatively, the compression module recovers from the storage module 40, a raw reconstructed image for the compressor.

From the storage module 40 or the display module 44, the reconstructed image 50, either in raw format, or in compressed format is transmitted to an output interface 52, via the link 46. From the output interface 52, the image processed as above described is sent via the link 54 to at least one external digital support.

A digital image acquisition sensor 18 according to the invention is now described. An example of implementation of the method of acquisition with a random pattern sensor 18, and of linear reconstruction of the captured image in the module 26, is presented in reference to FIGS. 2a and 2b.

In this first example of acquisition of an image 14 and of reconstruction of said image 30, the acquisition is carried out with an array 16 and an n×n reduced size pattern 70, with "n" a natural number which is preferably greater than or equal to 4.

The array of colour filters 16 forming the sensor 18 consists of a plurality of identical basic patterns 70 replicated with no overlap. Each of the basic patterns 70 is formed by colour filters 72, 82, 84 arranged pseudo-randomly, such that each basic pattern 70 contains a variable pitch between two consecutive same-type colour filters in the horizontal and/or vertical directions of the basic pattern.

The reconstruction implemented is linear and involves a weighting of a neighbourhood of pixels 76, of m×m dimension, m being a natural number, greater than n, whilst reducing the complexity of the reconstruction filters. Alternatively, the basic pattern and the neighbourhood are rectangular.

Also, a luminance and chrominance decomposition is applied.

For the calibration of the coefficients of the linear filters, the method is also produced by means of using a module being free of arrays of colour filters. Said module makes it possible to acquire an achromatic image which is used as a set point from which the determination of random pattern coefficients is carried out by the method of least squares.

The reconstruction of the image is then carried out from the estimated luminance and from the three interpolated chromatic components.

In said example, the method is presented according to the following steps I to III:

Step I of definitions of the array of colour filters 16 in respect to FIG. 2a illustrating an example of arrangement of a 6×6 size pattern 70, with highlighting of the basic pattern, with a 12×12 size neighbourhood 76.

A reduced size basic pattern 70 is defined in FIG. 2a, consisting of pixels 72 shown in black (corresponding to the colour green), of pixels 82 shown in stripes (corresponding to the colour blue) and of pixels 84 shown in white (corresponding to the colour red). For example, a 6×6 size pattern consists of a pseudo-random arrangement of colour filters, i.e. the pitch, between two consecutive same-type filters, is variable in the horizontal and vertical directions of the array. Said basic pattern is applied on blocks of the same size for the entire image. Said irregular pattern is applied on a centred hexagonal or square grid, for any number of filters and the filters of which are of any transmission.

The definition of said pattern is carried out from the consideration of alternation of the filters in the neighbourhood, in order to avoid agglomerates of filters of the same colour, thus avoiding the occurrences of "false colours". The solution retained is with two filters 72 and 84 of sensitivity very close to the wavelength (around the green and the red), pseudo-randomly covering the majority of a basic block and with a third filter 82 pseudo-randomly scattered the maximum sensitivity of which is in the blue. Said configuration is similar to that of the human visual system.

A replication with no overlap of said basic pattern 70 is applied over the entire array 16 of the sensor 18. The proposed sensor is therefore a combination between a periodic sensor, where the pitch between two same patterns of successive filters is constant and a totally pseudo-random sensor, on the scale of 6×6 size blocks of pixels.

The construction of the linear construction filters from the following calculations constitutes step II.

A calculation of the coefficients of the reconstruction filters is carried out. This is a calibration step for implementing the reconstruction, which is carried out once or several times according to the change of spatial (optical) or spectral (addition of coloured filters) characteristics of the acquired image. Said step is produced either by a simulation on a database of images, or by a construction and an application of a module being free of an array of colour filters.

The subtraction of the luminance of the mosaic of colours is carried out. A calculation of the colour information consisting of coded chrominances in opposition with colours is applied. The new weighting coefficients of the neighbourhood are used to produce the interpolation of the chrominance, i.e. the three chromatic colours.

Firstly, a calculation of the coefficients of the reconstruction filters is carried out. Said filters are used for weighting the influence of the pixels in the neighbourhood 76.

Then a selection of the reconstruction filters is defined directly from the missing colours in the mosaic 74 by using a significant database of images.

In this case, the action of the colour mosaic 74 is simulated, by deletion in said mosaic of the colours missing on the colour image, resulting in the obtaining of an intermediate image.

Then, a luminance image is estimated, as the weighted sum for each pixel of red, green and blue values of the images of the database, respectively with the pR, pG and pB coefficients of the R, G and B components. Said pR, pG and pB coefficients are the proportions of each filter which make up the pseudo-random mosaic. The luminance, i.e. the achromatic spatial information, is estimated for each pixel, for example one of the optimum values of the weighting coefficients is $pR=pG=pB=\frac{1}{3}$.

The coefficients of the battery of thirty six filters of variable sizes, are calculated as the solution to the least squares of the quadratic error between the intermediated image in simulated mosaic and the estimated luminance. Alternatively, an estimation of the filters of the luminance is based on the use of a second sensor module free of a colour filter array. Indeed, the luminance corresponds to a signal which would be measured by the sensor if it were free of the array of colour filters. The procedure therefore consists of using a sensor which is free of the array of colour filters for measuring the luminance and which is provided with the array of colour filters for measuring the mosaic of the database of images. Several photos of the same scene are taken with said two modules, in order to estimate the luminance filter from said database of photos. Said approach makes it possible to produce a configuration of filters, which best represents the optical and spectral characteristics of the acquisition system.

The estimation of the filters of the chrominance is also carried out by the method of least squares.

Said method makes it possible to estimate the interpolation filters of the reduced size chrominance, i.e. the reduction in practice of the surface of the neighbourhood 76.

Finally, a step III for linear reconstruction of the image 30 is carried out in reference to FIG. 2b.

The coefficients of the filters being calculated in step II, the reconstruction of the information is produced block by block 70, 80. The calculation of the value of the pixel is carried out using a weighted sum of all of the pixels of the neighbourhood 76, the same calculation with the thirty six different filters is carried out for all of the pixels 72, 82 and 84 of the block. Said calculation is also carried out for the following block 80 (in dotted lines in FIG. 2b), and the following neighbourhood 78 (in dotted lines in the same FIG. 2b), and for the entire image 30. Alternatively, said calculation is applied for any neighbourhood and block size.

The reconstruction of the image 30 is carried out with the sum of the estimated luminance and of the interpolated chrominance.

The method is defined in two stages, firstly a luminance and chrominance decomposition, and secondly, a recomposition of the image from the estimated luminance and from the interpolated chrominance. This makes it possible to use two arrays of different filters for the estimation of the luminance and for the interpolations of the chrominance and to thus eliminate the fields of intermediate spatial frequencies where "aliasing" occurs.

Advantageously, another embodiment of the reconstruction consists of calculating the chrominance as the difference between the luminance and the mosaic 74 of colours, this corresponds to the use of a chrominance filter as opposed to that of the luminance. Alternatively, in order to reduce the artefacts, the low-pass filters of the luminance and high-pass of the chrominance define the spectral bands sufficiently separated for substantially reducing the spectral overlap. This is another way of eliminating the intermediate spatial frequencies, where the risk of aliasing is higher.

A second example of embodiment of a method for acquiring an image 14 and for reconstructing said image 30, simplified in FIGS. 3a to 3i, is the acquisition of the image with an array 16 of colour filters of a size equal to that of the image. The array 16 is such as previously described, i.e. it consists of a plurality of identical basic patterns replicated with no overlap. Each of the basic patterns is formed by colour filters arranged pseudo-randomly, such that each basic pattern contains a variable pitch between two consecutive same-type colour filters in the horizontal and/or vertical directions of the basic pattern.

A luminance and chrominance decomposition is also applied.

An adaptive reconstruction of the image from the chrominances brought back into the baseband is carried out. Said reconstruction is produced via a calculation based on the gradient of the estimated luminance by a standardised R, G and B low-pass filter, the gradient of which indicates if the interpolation of chrominances must be carried out in the vertical or horizontal direction of the image. The term "horizontal gradient" means a change relating to the rows of the image and "vertical gradient" means a change relating to the columns of the image.

Said example also makes it possible to use the sensor 18 and the reconstruction module 26 for the reconstruction of the captured image 14 with the same advantages, by establishing a second example of embodiment the steps of which are presented and the results of the processing are simplified in FIGS. 3a to 3i.

FIGS. 3a to 3i are respectively the simplification of FIGS. 4a (original image 14), 4b (captured image 22), 4c (spectrum of the captured image 84), 4d (estimated low frequencies containing the luminance 86), 4e (the three chrominances plus the high frequencies of luminance 88), 4f (the initial red chrominance plus the high frequencies of luminance 90), 4g (interpolated red chrominance 92), 4h (luminance 94 estimated again, from the interpolated chrominances) and 4i (reconstructed image 22).

An original image 14 (FIG. 3a) is sampled by an array 16 of colour filters. The sampled image 22 (FIG. 3b) presents a spectrum 84 (FIG. 3c), the estimated low frequencies of which contain the luminance 86 (FIG. 3d) and the three chrominances plus the high frequencies of luminance 88 (FIG. 3e). A demultiplexing of the three chrominances of 88 (FIG. 3e) is carried out, for example here the initial red chrominance plus the high frequencies of luminance 90 (FIG. 3f) is illustrated. The three chrominances are then interpolated by means of the adaptive method, for example the red chrominance 92 (FIG. 3g) is interpolated from the initial red chrominance of 90 (FIG. 3f). The luminance 94 (FIG. 3h) is again estimated from the interpolated chrominances, i.e. from the red chrominance 92 and from the green and blue chrominances. The image 30 is finally reconstructed (FIG. 3i) from the estimated luminance and from the three interpolated components of the chrominance.

The acquisition of the image is carried out by a colour sensor 18, wherein is placed an array 16 of colour filters. The distribution of colours must be such that the chrominance carriers, defined by the Fourier transform of the modulation functions of each of the three chrominances, form a spectral modification, advantageously as white as possible in order to reduce the consistency effects of the chrominance on the luminance, as for example in the case where the carriers of chrominances are not very present in the spatial low frequencies of the luminance.

The acquisition and reconstruction method is based for example on the following three steps I to III:

Step I for estimation and removal of the luminance 86 (FIG. 3d) of the image 22.

The processing starts with the acquisition of the original image 14, in a captured image 22 (FIG. 3b). A spectral transformation of the image 22 is applied for example, in order to obtain the spectrum 84 (FIG. 3c). Then, the lowest frequencies, the low frequencies of the luminance are estimated via filtering.

The filter used is standardised in R, G and B, i.e. the function thereof is to respect at each spatial position, a height contribution of pR, pG and pB, respectively for each colour R, G and B. In other words, at each pixel, a standardisation of the filter takes place so that the sum of the coefficients corresponding to the R, G and B colour filters are also respectively at pR, pG and pB of the estimated luminance.

The luminance 86 (FIG. 3d) corresponds to the lowest frequencies, estimated from the image 22 of the sensor, is removed from said image 22, thus creating a spectrum 88 (FIG. 3e) with a spatial low frequencies hole in the spectrum 84 (FIG. 3c) of the image 22.

Interpolation of the chrominances from the gradient of the luminance (step II).

The demultiplexing of the image 22 is then applied by isolation of the images corresponding to the sub-arrays with the same spectral sensitivities, for example to the red chrominance of 90 (FIG. 3f). Said operation has the effect of bringing the chrominance carriers back into zero spatial frequencies, i.e. to the centre of the spectrum.

An interpolation is produced on the chrominances brought back into the baseband. The advantage of said method is to be able to use an adaptive interpolation, based on a calculation of the gradient of low frequencies of the estimated luminance 86 (FIG. 3d).

Said gradient indeed indicates, if an interpolation of the colours is carried out according to the vertical, the horizontal or as an average of the all of the neighbouring points: if the vertical gradient is stronger than the horizontal gradient, a contour is considered as horizontal, and the interpolation of colours is not carried out through said contour, but rather along the contour, i.e. horizontally in this case. The gradient of the luminance 86 (FIG. 3d), respectively horizontal and vertical, is used for deciding if the interpolation of the colours is carried out according to the horizontal or vertical direction, according to the respective values of the gradients. Thus, the red chrominance 92 (FIG. 3g) is interpolated.

Calculation of the luminance and of the adaptive reconstruction of the image (step III).

Given the linear nature of the composition of the luminance and of the chrominance, the chrominances interpolated by the adaptive method are removed from the image 22 acquired by the sensor, in order to recover all of the frequency bands of the luminance 94 (FIG. 3h). Said luminance is therefore calculated as being the residue of that which is not chromatic as regards the adaptation in luminance.

Then, the reconstruction of the image 30 is carried out from the estimated luminance 94 again (FIG. 3i) and from the three interpolated R, G, B chrominances.

The present invention is not limited to the examples of embodiment described. It is indeed possible to define pseudo-random colour filter sensor arrays with various sizes and shapes of patterns for the acquisition, the pseudo-random patterns being able to be periodic or non-periodic for example. Concerning the reconstruction, a multitude of methods may be applied, containing various numbers of steps and various types of calculations. The reconstruction module may be hosted in an external host machine or integrated into the digital processing unit.

It is also possible to define different arrays of colour filters, adapted according to the various types applications, for example satellite photos, medical imagery or others.

Generally, the real time reconstruction of the image is partial in a camera, in order to make it possible to display images in real time and have the possibility of carrying out successive photos.

As regards satellite images for example, or all of the devices that do not require immediate visualisation of the result and operate in delayed time, a recording of the captured data is carried out in raw format and then the complete reconstruction of colours is produced off-line.

Alternatively, the method also makes it possible to adapt the luminance and implement recursive filtering.

In addition, the present invention is applicable to any type of sensor, irrespective of the CDD ("Charged Coupled Device") or CMOS (Complementary Metal Oxide Semiconductor circuits) technology and irrespective of the size of the sensor.

The invention claimed is:

1. A digital image acquisition sensor (18) comprising an array (16) of colour filters, the array consisting of a plurality of identical basic patterns (70) which are replicated with no overlap along a vertical direction and a horizontal direction, each basic pattern being formed by colour filters (72, 82, 84), said color filters being pseudo-randomly arranged inside said basic pattern, such that each basic pattern (70) contains a variable pitch between two consecutive same-type colour filters in the horizontal and/or vertical directions of the basic pattern.

2. A sensor according to claim 1, wherein the basic pattern (70) of the colour filters of the array of colour filters is equal to or larger than 4×4 pixels of an image and is smaller than the size of said image.

3. A method for acquiring and reconstructing digital images from a sensor comprising an array (16) of colour filters, the array consisting of a plurality of identical basic patterns (70) which are replicated with no overlap, each basic pattern being formed by colour filters (72, 82, 84) which are pseudo-randomly arranged inside said basic pattern such that each basic pattern (70) contains a variable pitch between two consecutive same-type colour filters in the horizontal and/or vertical directions of the basic pattern, said method comprising filtering said images (14) during the acquisition thereof by said sensor (18) by means of said array of colour filters (16), thus carrying out acquisition of the red, green and blue components for reconstruction of at least one image (30), from said components acquired from each image (22).

4. A method according to claim 3, wherein a luminance and chrominance decomposition of the acquired image (22) is carried out.

5. A method according to claim 3, wherein a luminance and chrominance decomposition of the acquired image (22) is carried out, by means of the sensor and by means of a second sensor free of an array of colour filters for acquisition of the luminance.

6. A method according to any one of claim 4 or 5, wherein the luminance is estimated and the three components of the chrominance are interpolated from the data acquired by the pseudo-random pattern sensor (18).

7. A method according to claim 4, wherein the reconstruction of the image (30) is carried out from the estimated luminance and the three components of the chrominance interpolated from the acquired image (22).

8. A method according claim 4, wherein the reconstruction of the image (30) is linear and only involves a weighting of a neighbourhood of pixels (72), (82) and (84), from the basic pattern (70) and from a neighbourhood (76).

9. A method according to claim 4, wherein the reconstruction of the image (30) is adaptive and non-linear, and carries out an interpolation of the chrominances of the spectrum (88) brought back into the baseband, via a calculation based on the gradient of the luminance (86) estimated by a standardised low-pass filter, said gradient of the low frequencies of the luminance (86) indicating the vertical or horizontal direction of interpolation of the three chrominances.

10. A method according to claim 9, wherein demosaicing is carried out by eliminating high-risk frequencies by transfer of carriers of said zero spatial frequency chrominances.

11. An image acquisition system for implementing the method according to claim 4, comprising digital acquisition and processing modules connected with one another, including the sensor (18), a compression module (32) connected to a reconstruction module (26), a storage module (40), a display module (44) and an output interface (52).

12. A digital image acquisition and reconstruction system according to claim 11 for implementing the method wherein the reconstruction of the image (30) is linear and only involves a weighting of a neighbourhood of pixels (72), (82) and (84), from the basic pattern (70) and from a neighbourhood (76), wherein the image (30) is reconstructed in the reconstruction module (26).

13. A digital image acquisition and reconstruction system according to claim 12, wherein the image reconstructed (30) in the reconstruction module (26) is compressed by at least one encoder in the compression module (32).

14. A digital image acquisition and reconstruction system according to claim 12, wherein the image reconstructed (30) in the reconstruction module (26) is compressed by at least one encoder (32) included in the reconstruction module (26).

15. A digital image acquisition and reconstruction system according to claim 11 for implementing the method, wherein the reconstruction of the image (30) is adaptive and non-linear, and carries out an interpolation of the chrominances of the spectrum (88) brought back into the baseband, via a calculation based on the gradient of the luminance (86) estimated by a standardised low-pass filter, said gradient of the low frequencies of the luminance (86) indicating the vertical or horizontal direction of interpolation of the three chrominances.

16. A digital image acquisition and reconstruction system according to claim 15, wherein the image reconstructed (30) in the reconstruction module (26) is compressed by at least one encoder in the compression module (32).

17. A digital image acquisition and reconstruction system according to claim 15, wherein the image reconstructed (30) in the reconstruction module (26) is compressed by at least one encoder (32) included in the reconstruction module (26).

* * * * *